United States Patent
Zhao et al.

(10) Patent No.: US 10,623,531 B2
(45) Date of Patent: Apr. 14, 2020

(54) RAMAN SPECTROSCOPIC DEVICE AND COMMUNICATION METHOD THEREOF

(71) Applicant: Nuctech Company Limited, Beijing (CN)

(72) Inventors: Ziran Zhao, Beijing (CN); Hongqiu Wang, Beijing (CN); Nei Yang, Beijing (CN); Xiaodong Qin, Beijing (CN)

(73) Assignee: Nuctech Company Limited, Beijing (CN)

( * ) Notice: Subject to any disclaimer, the term of this patent is extended or adjusted under 35 U.S.C. 154(b) by 178 days.

(21) Appl. No.: 15/835,204

(22) Filed: Dec. 7, 2017

(65) Prior Publication Data

US 2018/0183904 A1 Jun. 28, 2018

(30) Foreign Application Priority Data

Dec. 26, 2016 (CN) .......................... 2016 1 1220115

(51) Int. Cl.
  *H04L 29/06* (2006.01)
  *H04L 29/08* (2006.01)
  *G01J 3/44* (2006.01)
  *G01N 21/65* (2006.01)

(52) U.S. Cl.
  CPC .............. *H04L 69/164* (2013.01); *G01J 3/44* (2013.01); *H04L 65/1069* (2013.01); *H04L 65/60* (2013.01); *H04L 67/125* (2013.01); *G01N 21/65* (2013.01); *H04L 69/10* (2013.01)

(58) Field of Classification Search
  CPC ... H04L 69/164; H04L 65/60; H04L 65/1069; H04L 67/125; H04L 69/10; G01J 3/44; G01N 21/65
  See application file for complete search history.

(56) References Cited

U.S. PATENT DOCUMENTS

2009/0276515 A1* 11/2009 Thomas .................. H04L 67/34
  709/223
2011/0190760 A1* 8/2011 Niver .................... A61B 5/0075
  606/33

(Continued)

FOREIGN PATENT DOCUMENTS

CN  104394234 A  3/2015
CN  105245528 A  1/2016

(Continued)

OTHER PUBLICATIONS

Chatterjee et al., "Remote access and display of neutron data" (Year: 2002).*

(Continued)

*Primary Examiner* — Shirley X Zhang
(74) *Attorney, Agent, or Firm* — Knobbe, Martens, Olson & Bear, LLP

(57) ABSTRACT

A Raman spectroscopic device and a communication method thereof are disclosed. In one aspect, an example Raman spectroscopic device comprises a communication unit configured to communicate with at least one of a server and a management terminal through one or more types of communication interfaces for one or more respective purposes. One or more communication interfaces are established based on a User Datagram Protocol (UDP).

14 Claims, 5 Drawing Sheets

(56) References Cited

U.S. PATENT DOCUMENTS

| | | | |
|---|---|---|---|
| 2012/0019819 A1* | 1/2012 | Messerchmidt | G01J 3/433 |
| | | | 356/301 |
| 2013/0159418 A1* | 6/2013 | Jung | H04L 67/125 |
| | | | 709/204 |
| 2014/0086121 A1* | 3/2014 | Emeott | H04L 67/34 |
| | | | 370/311 |
| 2016/0081597 A1 | 3/2016 | Bhavaraju et al. | |
| 2016/0132617 A1* | 5/2016 | Liu | G06F 17/5009 |
| | | | 703/2 |

FOREIGN PATENT DOCUMENTS

| | | |
|---|---|---|
| CN | 105376298 A | 3/2016 |
| EP | 3 160 109 A1 | 4/2017 |
| WO | WO 2015/073459 A1 | 5/2015 |

OTHER PUBLICATIONS

Extended European Search Report for Application No. EP 17205860 dated Apr. 16, 2018, in 25 pages.

Office Action Issued in European Application No. 17205860.4. dated Jan. 15, 2020, which corresponds in priority to above-identified subject U.S. Application.

Carrabba et al., "Compact Raman Instrumentation for Process and Environmental Monitoring" Visual Communications and Image Processing; vol. 1434, pp. 127-134 dated Jan. 1, 1991.

* cited by examiner

RAMAN SPECTROSCOPIC DEVICE AND COMMUNICATION METHOD THEREOF

CROSS-REFERENCE TO RELATED APPLICATION

This application claims priority to Chinese Patent Application No. 201611220115.7, filed on Dec. 26, 2016, entitled "RAMAN SPECTROSCOPIC DEVICES AND COMMUNICATION METHODS THEREOF," which is incorporated herein by reference in its entirety.

BACKGROUND OF THE DISCLOSED TECHNOLOGY

Field of the Technology

The disclosed technology relates to the field of Raman spectroscopic inspection and application, and more particularly, to a Raman spectroscopic device and a communication method thereof.

Description of the Related Technology

Raman spectroscopic analysis technology is currently widely regarded as one of the most effective and rapid substance recognition technologies. As different substances have different molecular structures, Raman spectra thereof are different from each other. Thus, Raman spectra of substances may be observed to learn molecular properties of the substances and recognize the substances. Based on advantages of inspection using Raman spectra, for example, high accuracy, high speed, non-destruction and so on, Raman spectroscopic analysis has gained wide attention in various fields of application and a variety of Raman spectroscopic products have been developed. For example, Nuctech (Beijing, CHINA) has developed many series (for example, RT1003, RT3000, RT5000 and RT6000, etc.) of Raman spectroscopic products, which have been widely used in fields such as security inspection, anti-drugs, anti-smuggling, food safety and jewelry appraisal and the like, and have played a crucial role in aspects such as guarantee of market orders and protection of national security.

However, most existing Raman spectroscopic devices are used standalone and rarely have interfaces for secondary development (for example, data communication, device management, system upgrades, etc.) Even in a Raman spectroscopic device having such an interface, the interface is generally implemented based on a TCP protocol. The TCP protocol is a connection dependent communication protocol, and there may be the following defects if the TCP protocol is applied in the Raman spectroscopic device:

1. The TCP protocol has a low connection speed (usually about 60 seconds). However, in the fields such as security inspection etc., rapid analysis and judgment of inspection result is required. Therefore, the connection speed seriously affects the instant effect of the Raman spectroscopic device;

2. It needs to maintain the communication connection, which increases the complexity and increase a burden of a server;

3. Only a single function can be achieved. For example, a function of one device acting as not only a server but also a client on the same communication port cannot be realized; and 4. It is inconvenient to manage the device.

SUMMARY

The disclosed technology proposes a Raman spectroscopic device and a communication method thereof.

According to an aspect of the disclosed technology, there is proposed a Raman spectroscopic device. The Raman spectroscopic device comprises: a communication unit configured to communicate with at least one of a server and a management terminal through one or more types of communication interfaces for one or more respective purposes, wherein the one or more communication interfaces are established based on a User Datagram Protocol (UDP).

In an embodiment, the communication by the communication unit comprises operations of: receiving a handshake command from the at least one of the server and the management terminal; transmitting a handshake response to the at least one of the server and the management terminal; receiving a data package from the at least one of the server and the management terminal; and feeding back a result of an operation which is performed according to data in the data package to the at least one of the server and the management terminal.

In an embodiment, the Raman spectroscopic device further comprises a processor connected to the communication unit and configured to: receive the data package from the communication unit; perform an operation according to the data in the data package; and return a result of the operation to the communication unit.

In an embodiment, the communication unit is further configured to: verify the data package after receiving the data package; and feed back the result of the operation which is performed according to the data in the data package to the at least one of the server and the management terminal only if the verification is successful.

In an embodiment, the communication by the communication unit comprises operations of: broadcasting at least one of identification information of the Raman spectroscopic device and Raman spectrum inspection data to the at least one of the server and the management terminal.

In an embodiment, the communication by the communication unit comprises operations of: receiving a broadcast command from the at least one of the server and the management terminal; and transmitting at least one of identification information of the Raman spectroscopic device and Raman spectrum inspection data to the at least one of the server and the management terminal.

In an embodiment, the communication by the communication unit comprises operations of: transmitting a request for data of other Raman spectroscopic devices to the at least one of the server and the management terminal; and receiving the requested data of the other Raman spectroscopic devices.

In an embodiment, receiving the requested data of the other Raman spectroscopic devices comprises: receiving, from the at least one of the server and the management terminal, data pre-stored in the at least one of the server and the management terminal or acquired by the at least one of the server and the management terminal from various other Raman spectroscopic devices.

In an embodiment, receiving the requested data of the other Raman spectroscopic devices comprises: receiving the data from various other Raman spectroscopic devices, respectively.

According to another aspect of the disclosed technology, there is proposed a communication method performed by a Raman spectroscopic device. The method comprises performing the following steps through one or more types of communication interfaces: receiving a handshake command from at least one of a server and a management terminal; transmitting a handshake response to the at least one of the server and the management terminal; receiving a data package from the at least one of the server and the management terminal; and feeding back a result of an operation which is performed according to data in the data package to the at least one of the server and the management terminal, wherein the one or more communication interfaces are established based on a User Datagram Protocol (UDP).

In an embodiment, the communication method further comprises: verifying the data package after receiving the data package; and feeding back the result of the operation which is performed according to the data in the data package to the at least one of the server and the management terminal only if the verification is successful.

According to another aspect of the disclosed technology, there is proposed a communication method performed by a Raman spectroscopic device. The method comprises performing the following steps through one or more types of communication interfaces: receiving a broadcast command from at least one of a server and a management terminal; and transmitting at least one of identification information of the Raman spectroscopic device and Raman spectrum inspection data to the at least one of the server and the management terminal, wherein the one or more communication interfaces are established based on a User Datagram Protocol (UDP).

According to another aspect of the disclosed technology, there is proposed a communication method performed by a Raman spectroscopic device. The method comprises performing the following steps through one or more types of communication interfaces: transmitting a request for data of other Raman spectroscopic devices to at least one of a server and a management terminal; and receiving the requested data of the other Raman spectroscopic devices, wherein the one or more communication interfaces are established based on a User Datagram Protocol (UDP).

In an embodiment, receiving the requested data of the other Raman spectroscopic devices comprises: receiving, from at least one of the server and the management terminal, data, pre-stored in the at least one of the server and the management terminal or acquired by the at least one of the server and the management terminal from various other Raman spectroscopic devices.

In an embodiment, receiving the requested data of the other Raman spectroscopic devices comprises: receiving the data from various other Raman spectroscopic devices, respectively.

DETAILED DESCRIPTION OF CERTAIN ILLUSTRATIVE EMBODIMENTS

The specific embodiments of the disclosed technology will be described in detail below. It should be noted that the embodiments herein are used for illustration only, without limiting the disclosed technology. In the description below, a number of specific details are explained to provide better understanding of the disclosed technology. However, it is apparent to those skilled in the art that the disclosed technology can be implemented without these specific details. In other instances, well known structures, materials or methods are not described specifically so as not to obscure the disclosed technology.

Throughout the specification, the reference to "one embodiment," "an embodiment," "one example" or "an example" means that the specific features, structures or properties described in conjunction with the embodiment or example are included in at least one embodiment of the disclosed technology. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the accompanying drawings provided here are for the purpose of illustration and are not necessarily to be drawn to scale. The term "and/or" used herein means any and all combinations of one or more listed items.

In general, "interface" broadly refers to an entity of a specific device entity which is used to provide the specific device entity itself to the outside or an abstract concept thereof. Depending on different circumstances, there are many different implementations of the "interface". For example, an interface of a computer which is used to interact with people is implemented as a "user interface"; an interface between computer hardware is implemented as a hardware interface (for example, a USB, and etc.) for connecting entities; and an information transmission interface implemented through programs, software, etc. is implemented as a virtual interface, which is implemented through a program expression structure. The interface herein refers to a "virtual interface" which is used to enable inter-entity communication under a particular communication protocol.

The disclosed technology will be specifically described below with reference to the accompanying drawings.

A communication scenario of a Raman spectroscopic device according to an embodiment of the disclosed technology will be described below.

Figure 1:
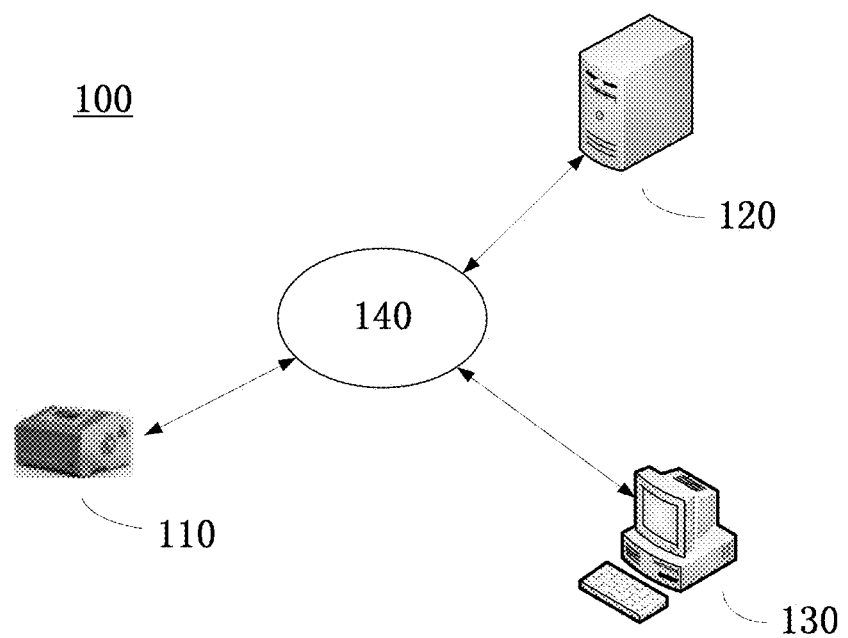
FIG. 1 illustrates communication network architecture of Raman spectroscopic devices in a first scenario according to an embodiment of the disclosed technology.

Firstly, as shown in FIG. 1, illustrated is communication network architecture 100 of Raman spectroscopic devices in a first scenario according to an embodiment of the disclosed technology.

As illustrated, the communication network architecture 100 of the Raman spectroscopic devices comprises a Raman spectroscopic device 110, a server 120, a management terminal 130 and a network 140. The Raman spectroscopic device 110, the server 120, and the management terminal 130 are connected to the network 140, to communicate with each other through the network 140.

The Raman spectroscopic device 110 may be any type of Raman spectroscopic device 110, such as any of the RT1003, RT3000, RT5000, and RT6000 series of Raman spectroscopic devices manufactured by Nuctech. It should be illustrated that, although only a single Raman spectroscopic device 110 is shown in FIG. 1, the embodiments of the disclosed technology are not limited thereto. In other embodiments, two or more Raman spectroscopic devices 110 may also be included in the communication network architecture 100 of the Raman spectroscopic devices. When two or more Raman spectroscopic devices 110 are included in the communication network architecture 100 of the Raman spectroscopic devices, these devices may be connected to the network 140 in parallel or may be connected to the network 140 through a single link, which is not limited herein.

The server 120 may be any type of web server such as a dedicated server for implementing a specific function or a general cloud server etc. The server 120 may have a memory for storing data, instructions and programs, or may be connected to a dedicated database server.

The management terminal 130 may be a terminal device such as a computer, a tablet, a mobile phone etc., through which a user may monitor and manage the Raman spectroscopic device 110.

In one embodiment, the management terminal 130 communicates directly with the Raman spectroscopic device 110 to control the Raman spectroscopic device 110 to operate so as to achieve a specific function. In another embodiment, the management terminal 130 communicates with the Raman spectroscopic device 110 via the server 120. In yet another embodiment, the management terminal 130 not only communicates directly with the Raman spectroscopic device 110 but also communicates with the Raman spectroscopic device 110 via the server 120 to achieve different functions, respectively.

The network 140 may be any wired network or wireless network, such as WiFi, a mobile communication network, a Bluetooth network, etc. It should be pointed out that although only a single network 140 is shown in FIG. 1, it should be understood that the Raman spectroscopic device 110, the server 120, and the management terminal 130 may communicate with each other through different networks 140.

Figure 2:
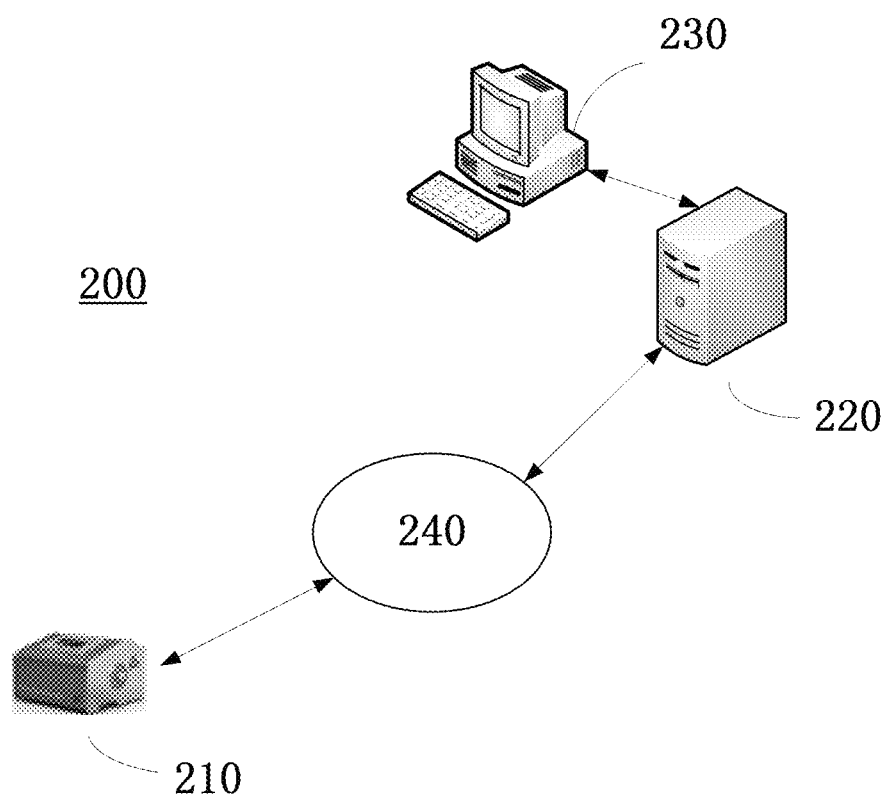
FIG. 2 illustrates communication network architecture of Raman spectroscopic devices in a second scenario according to an embodiment of the disclosed technology.

Next, as shown in FIG. 2, illustrated is communication network architecture 200 of Raman spectroscopic devices in a second scenario according to an embodiment of the disclosed technology.

As illustrated, the communication network architecture 200 of the Raman spectroscopic devices comprises a Raman spectroscopic device 210, a server 220, a management terminal 230, and a network 240. The Raman spectroscopic device 210 and the server 220 are connected to the network 140 and may communicate with each other over the network 140. The management terminal 230 is connected to the server 220 to control the server 220 to communicate with the Raman spectroscopic device 210 and thus to monitor and manage the Raman spectroscopic device 210.

Except for the difference in the above connection modes, the Raman spectroscopic device 210, the server 220, the management terminal 230 and the network 240 are similar to the respective devices in FIG. 1, and details thereof will not be described herein again.

A Raman spectroscopic device according to an embodiment of the disclosed technology and a communication method thereof will be described below in combination with the first scenario in FIG. 1. It should be understood that these descriptions are merely exemplary, and are not limited to the scenario in FIG. 1, but may also be applied to the scenario in FIG. 2 or other suitable scenarios.

Figure 3:
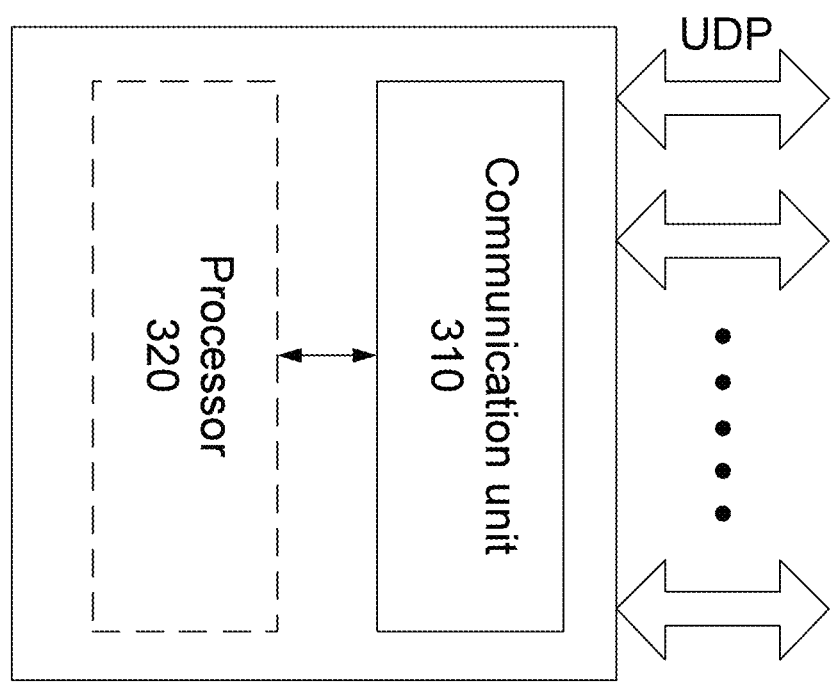
FIG. 3 illustrates a structural block diagram of a Raman spectroscopic device according to an embodiment of the disclosed technology.

FIG. 3 illustrates a structural block diagram of a Raman spectroscopic device 110 according to an embodiment of the disclosed technology.

As shown in FIG. 3, the Raman spectroscopic device 110 comprises a communication unit 310 and a processor 320. It should be understood that although FIG. 3 illustrates the processor 320, the technical solutions according to the embodiments of the disclosed technology are not necessarily directed to the processor 320 (and thus, the processor 320 is illustrated in FIG. 3 by dashed lines). The structure in FIG. 3 is merely exemplary, and in other embodiments, the Raman spectroscopic device 110 may not comprise the processor 320.

One or more types of communication interfaces (as illustrated by a plurality of bidirectional arrows on the right side of FIG. 3) are also illustrated in FIG. 3. The communication unit 310 is configured to communicate with a server and/or a management terminal through the one or more types of communication interfaces for one or more respective purposes. The one or more communication interfaces are established based on a User Datagram Protocol (UDP).

Specifically, the communication interfaces may have a variety of types, such as basic command, management command, historical data, upgrade command etc., for different communication purposes. Table 1 below exemplarily illustrates more than 60 interfaces with these types. It should be understood that these interface types and descriptions are only exemplary and do not limit the disclosed technology.

TABLE 1

| Serial number | Interface type | Interface name | Function name | Function description |
| --- | --- | --- | --- | --- |
| 1. | Communication channel | Service communication port start | Cmm_Start Server | The interface creates a service communication port to receive a request for communication from a client, and operates on a server. |
| 2. | | Client communication port start | Cmm_Start Client | The interface creates a client communication port to receive communication from a server side, and operates on a client. |
| 3. | | Close | Cmm_Close | The interface closes a communication channel to release occupied resources, and operates on a server and a client at the same time. |

TABLE 1-continued

| Serial number | Interface type | Interface name | Function name | Function description |
|---|---|---|---|---|
| 4. | Basic command | Handshake command | Cmd_Link | The interface is used by two parties of communication to confirm whether the other party is online before the two parties communicate with each other, and operates on a server and a client at the same time. |
| 5. | | Real-time result | Cmd_Send Result | The interface transmits a real-time inspection result. The interface operates on a client, and transmits the inspection result once the inspection is completed. If a connection to a network is turned off, the inspection result is stored in a linked list to be transmitted, and when a connection to the idle network is turned on, the inspection result is transmitted. |
| 6. | | User login command | Cmd_UserLogin | The interface operates on a client, and informs a server of the command at the time of login. |
| 7. | | User leave command | Cmd_UserLeave | The interface operates on a client, and informs a server of the command at the time of switching between users. |
| 8. | | Failure inspection command | Cmd_Send Failure | The interface operates on a client, and transmits the command when a failure occurs. |
| 9. | | Remote measurement command start | Cmd_RemoteMeasure | The interface operates on a server, and remotely starts measurement through a network. This is suitable for remote measurement of dangerous articles. |
| 10. | | Transmission of a response to a remote measurement command | Cmd_ResponeRemoteMeasure | The interface operates on a client, responds to remote measurement through a network and then feeds back a response. |
| 11. | | Basic device information registration | Cmd_RegDevInfor | The interface operates on a client to register device information. When a target IP or port is null, the interface transmits the information through broadcast, and if the target IP or port is not null, the interface registers the information with a specified server. |
| 12. | | Basic information of nearby devices | Cmd_NearbyDevInfor | The interface operates on a client, and issues the acquired information of nearby devices through broadcast, which is convenient for subsequent data exchange. |
| 13. | | Self-established database spectrogram upload | Cmd_UploadSelfSpecData | The interface operates on a client, and uploads a self-established database spectrogram. |

TABLE 1-continued

| Serial number | Interface type | Interface name | Function name | Function description |
|---|---|---|---|---|
| 14. | | Server-uploaded spectrogram inquiry | Cmd_SearchServerUpSpecData | The interface operates on a client, and inquires a spectrogram uploaded by a server. |
| 15. | | Deletion of inquired result files of a spectrogram of a server | Cmd_DeleteSearchSpecXMLFile | The interface operates on a client, and deletes inquired result files of a spectrogram of a server. |
| 16. | | Download of a spectrogram uploaded by a server | Cmd_DownloadSpecData | The interface operates on a client, and downloads a spectrogram uploaded by a server. |
| 17. | | File upload | Cmd_UploadFile | The interface operates on a client, and uploads files to a server. |
| 18. | | ReachBack service | Cmd_ReachBack | The interface operates on a client, and performs a ReachBack service. |
| 19. | Management command | Reboot command | Admin_Reboot | The interface reboots a device, and primarily operates on a server. After receiving an instruction, a client reboots the device. |
| 20. | | Device state acquisition command | Admin_GetDevStatus | The interface operates on a server, and acquires a state of a specified device. |
| 21. | | Online broadcast command | Admin_OnlineBroadcast | The interface operates on a server, and performs online broadcast. When the broadcast is received by a client, the client transmits an online response. |
| 22. | | Online user acquisition command | Admin_GetOnlineUser | The interface operates on a server, and acquires a current login user of a specified device. |
| 23. | | Time acquisition command | Admin_GetDateTime | The interface operates on a server, and acquires a system time of a specified device. |
| 24. | | Time synchronizationcommand | Admin_SetDateTime | The interface operates on a server, and sets a time of a specified device for time synchronization calibration. |
| 25. | | Measurement mode acquisition command | Admin_GetMeasureMode | The interface operates on a server, and acquires a measurement mode of a specified device. |
| 26. | | Measurement mode setting command | Admin_SetMeasureMode | The interface operates on a server, and sets a measurement mode of a specified device. |
| 27. | | Recognition mode acquisition command | Admin_GetRegMode | The interface operates on a server, and acquires a recognition mode of a specified device. |
| 28. | | Recognition mode setting command | Admin_SetRegMode | The interface operates on a server, and sets a recognition mode of a specified device. |
| 29. | | Device ID acquisition | Admin_GetDevID | The interface operates on a server, and acquires a device ID. |
| 30. | | Device ID setting | Admin_SetDevID | The interface operates on a server, and sets a device ID. |

TABLE 1-continued

| Serial number | Interface type | Interface name | Function name | Function description |
|---|---|---|---|---|
| 31. | | Device alias acquisition | Admin_Get DevAliases | The interface operates on a server, and acquires an alias of a specified device. |
| 32. | | Device alias setting | Admin_Set DevAliases | The interface operates on a server, and sets an alias of a specified device. |
| 33. | | Device IP acquisition command | Admin_Get DevIP | The interface operates on a server, and acquires an IP address of a specified device. |
| 34. | | Device IP setting command | Admin_Set DevIP | The interface operates on a server, and sets an IP address of a specified device. |
| 35. | | Language acquisition command | Admin_GetLanguage | The interface operates on a server, and acquires a language of a specified device. |
| 36. | | Language setting command | Admin_SetLanguage | The interface operates on a server, and sets a language of a specified device. |
| 37. | | Laser power acquisition command | Admin_GetLaserPower | The interface operates on a server, and acquires laser power of a specified device. |
| 38. | | Laser power setting command | Admin_SetLaserPower | The interface operates on a server, and sets laser power of a specified device. |
| 39. | | Device location acquisition command | Admin_Get DevLocation | The interface operates on a server, and acquires a location where a specified device is placed. |
| 40. | | Device location configuration command | Admin_Set DevLocation | The interface operates on a server, and sets a location where a specified device is placed. |
| 41. | | Configuration file data acquisition | Admin_Get CfgFile | The interface operates on a server, and acquires configuration files. |
| 42. | | Configuration file data transmission | Admin_Set CfgData | The interface transmits configuration file data and operates on a server. |
| 43. | | Soft version acquisition command | Admin_Get SoftVersion | The interface operates on a server, and acquires a software version. |
| 44. | | Algorithm version acquisition command | Admin_Get AlgVersion | The interface operates on a server, and acquires an algorithm version. |
| 45. | | Spectrogram database version acquisition command | Admin_Get DBVersion | The interface operates on a server, and acquires a spectrogram database version. |
| 46. | | Result transmission mode acquisition | Admin_Get SndResultMode | The interface operates on a server, and acquires an inspection result transmission mode. |
| 47. | | Result transmission mode setting | Admin_SetSndResultMode | The interface operates on a server, and sets an inspection result transmission mode. |
| 48. | | Network startup mode acquisition | Admin_Get NetMode | The interface operates on a server, and acquires a network startup mode of a client. |

TABLE 1-continued

| Serial number | Interface type | Interface name | Function name | Function description |
|---|---|---|---|---|
| 49. | | Network startup mode setting | Admin_Set NetMode | The interface operates on a server, and sets a network startup mode of a client. |
| 50. | | Basic device information acquisition | Admin_Get DevInfor | The interface operates on a server, and acquires device information. |
| 51. | | Measurement data acquisition | Admin_ GetMeasureDataFile | The interface operates on a server, and acquires measurement data files. |
| 52. | | Result binding ID setting | Admin_ SetResultBindID | The interface operates on a server, and sets a result binding ID (for example, if it is bound to CT, the result binding ID is an image ID). |
| 53. | Historical data | Historical inspection result count inquiry | HisData_ GetHisResultCount | The interface operates on a server, and acquires a specified historical inspection result count. |
| 54. | | Historical inspection result acquisition | HisData_ GetHisResult | The interface operates on a server, and acquires specified historical inspection results. |
| 55. | | Historical inspection result file acquisition | HisData_ GetHisResultFile | The interface operates on a server, and acquires specified historical inspection result files. |
| 56. | | Historical inspection data file acquisition | HisData_ GetHisDataFile | The interface operates on a server, and acquires specified historical inspection data files. |
| 57. | | Acquired historical inspection result buffer clear-up | HisData_ ClearHisSearch-Buffer | The interface operates on a server, and clears up a historical inquiry buffer. |
| 58. | | Historical inspection failure file acquisition | HisData_ GetHisFailureFile | The interface operates on a server, and acquires historical inspection failure files. |
| 59. | Upgrade | Upgrade start | UpSoft_ Start | The interface operates on a server, and informs a client the upgrade starts. |
| 60. | | Upgrade file transmission | UpSoft_ SendFile | The interface operates on a server, and transmits upgrade data files to a client. |
| 61. | | Upgrade end | UpSoft_End | The interface operates on a server, and informs a client transmission of upgrade files ends. |
| 62. | | Upgrade state inquiry | UpSoft Get Status | The interface operates on a server, and inquires a state of upgrade. |
| 63. | | Upgrade success | UpSoft_ Sucess | The interface operates on a server, and informs the server that upgrade is successful. |

Depending on different communication purposes, not only the interfaces used may be different, but also the communication flows may also be different. Communication flows of various communication methods which are performed by the Raman spectroscopic device 110 through the interfaces established based on the UDP in the first scenario will be described below in combination with the structure of the Raman spectroscopic device 110 in FIG. 3 through methods 400-600 in FIGS. 4-6. It should be pointed out that although communication between the Raman spectroscopic device 110 and the server 120 will be taken as an example in the following description, the method described is also applicable to direct communication between the Raman spectroscopic device 110 and the management terminal 130 or communication between the Raman spectroscopic device 110 and the management terminal 130 via the server 120.

Figure 4:
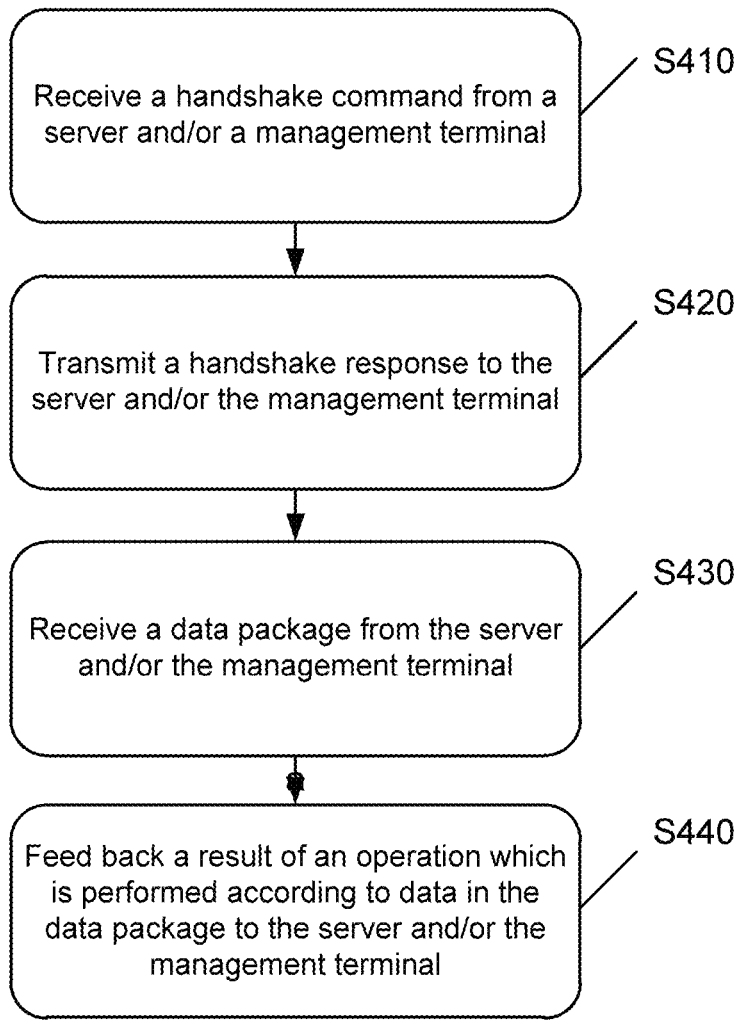
FIG. 4 illustrates a flowchart of a communication method performed by a Raman spectroscopic device according to an embodiment of the disclosed technology.

FIG. 4 illustrates a flowchart of a communication method 400 performed by the Raman spectroscopic device 110 according to an embodiment of the disclosed technology. The method 400 may be implemented as basic control, management, data update, upgrade and issuance, etc. by the server 120 for the Raman spectroscopic device 110. The method 400 comprises performing the following steps S410 to S440 through one or more types of communication interfaces which are implemented based on the UDP protocol.

Specifically, in step S410, the Raman spectroscopic device 110 receives a handshake command from the server 120 (via a communication unit 310).

After the Raman spectroscopic device 110 is put into use, the Raman spectroscopic device 110 needs to be registered with the server 120 (which will be described below). The step S410 refers to that the Raman spectroscopic device 110, as a device which has already been registered with the server 120, may receive a specific handshake command from the server 120. The handshake command is used to determine whether the Raman spectroscopic device is ready to receive a command or data which will be transmitted by the server 120.

Then, in step S420, the Raman spectroscopic device 110 transmits a handshake response to the server 120 (via the communication unit 310).

If the Raman spectroscopic device 110 is ready for reception, it informs the server 120 through a positive acknowledgement handshake response that the command or data can be transmitted. On the contrary, if the Raman spectroscopic device 110 is not yet ready, it informs the server 120 through a negative acknowledgement handshake response that transmission of the command or data should be postponed. Alternatively, a code of a reason why the Raman spectroscopic device 110 is not yet ready may further be included in the negative acknowledgement handshake response.

Of course, there may also be a link condition or a network device failure, in which case the transmission of the handshake command or the handshake response cannot be successfully implemented. In one embodiment, when the server 120 does not receive any handshake response within a certain threshold time after the server 120 transmits the handshake command, the server 120 judges that there is a problem with the connection therebetween. In one embodiment, the server 120 prompts the user to additionally detect the connection between the Raman spectroscopic device 110 and the server 120.

Next, in step S430, the Raman spectroscopic device 110 receives a data package from the server 120 (via the communication unit 310).

The data package comprises a header portion and a data portion. The data portion comprises a command or data transmitted by the server 120.

In one embodiment, the Raman spectroscopic device 110 is further configured to verify the data package after receiving the data package. Further, subsequent operations can be performed only if the verification is successful. If the verification fails, the Raman spectroscopic device 110 transmits error information to the server 120 or requests the server 120 to retransmit the data package.

Finally, in step S440, the Raman spectroscopic device 110 feeds back a result of an operation which is performed according to data in the data package to the server 120 (via the communication unit 310).

In one embodiment, the processor 320 in the Raman spectroscopic device 110 receives the data package from the communication unit 310 and performs an operation (for example, an action indicated by the command or updating or upgrading using the data) according to the command or data in the data package. After the operation is completed, the processor 320 returns a result of the operation to the communication unit 310. Then, the communication unit 310 feeds back the result to the server 120.

It should be pointed out that if the data package comprises a data transmission instruction, data transmission indicated by the instruction then continues to be initiated between the Raman spectroscopic device 110 and the server 120.

In addition, the server 120 may terminate the communication by transmitting another handshake command during the communication.

Figure 5:
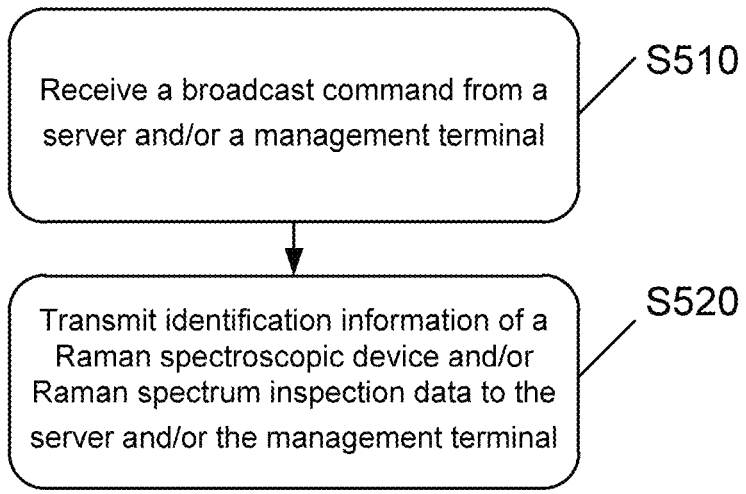
FIG. 5 illustrates a flowchart of another communication method performed by a Raman spectroscopic device according to an embodiment of the disclosed technology.

FIG. 5 illustrates a flowchart of another communication method 500 performed by the Raman spectroscopic device 110 according to an embodiment of the disclosed technology. The method 500 may be implemented as a process of the Raman spectroscopic device 110 registering with the server 120 or transmitting inspection data to the server 120. The method 500 comprises performing the following steps S510 to S520 through one or more types of communication interfaces which are implemented based on the UDP protocol.

In step S510, the Raman spectroscopic device 110 receives a broadcast command from the server 120.

In one embodiment, the broadcast command may be a probe broadcast transmitted by the server 120 for registering a new Raman spectroscopic device 110 therewith. In another embodiment, the broadcast command may be an instruction for instructing a specific Raman spectroscopic device (for example, the Raman spectroscopic device 110) to upload an inspection result thereof.

In step S520, the Raman spectroscopic device 110 transmits identification information of the Raman spectroscopic device and/or Raman spectrum inspection data to the server 120.

In one embodiment, if the broadcast command is a probe broadcast, after receiving the broadcast, the Raman spectroscopic device 110 returns device identification information thereof to the server 120 to enable registration. It should be pointed out that, in other embodiments, the registration process may also be initiated by the Raman spectroscopic device 110. After the Raman spectroscopic device 110 is put into use, the Raman spectroscopic device 110 broadcasts the device identification information thereof to the network 140, and the server 120 may acquire the device identification information for subsequent management and monitoring. This registration process may be implemented without the server 120 transmitting the probe broadcast.

In another embodiment, if the broadcast command is an upload instruction, after receiving the broadcast, the Raman spectroscopic device 110 returns an inspection result thereof to the server 120. It should be pointed out that, in other embodiments, the process of uploading the inspection result may also be initiated by the Raman spectroscopic device 110. The Raman spectroscopic device 110 broadcasts the inspection result thereof to the network 140 each time a certain number of inspection results are obtained or every predetermined time interval. The upload process may be implemented without the server 120 transmitting the upload instruction.

Figure 6:
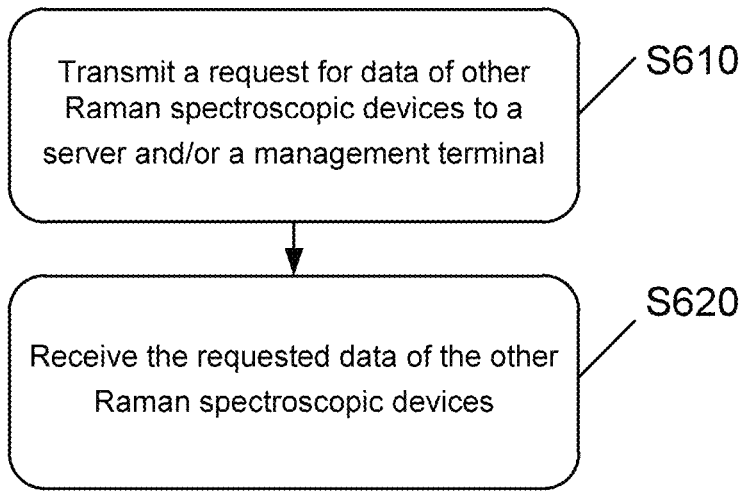
FIG. 6 illustrates a flowchart of yet another communication method performed by a Raman spectroscopic device according to an embodiment of the disclosed technology.

FIG. 6 illustrates a flowchart of yet another communication method 600 performed by the Raman spectroscopic device 110 according to an embodiment of the disclosed technology. The method 600 may be implemented as a scheme of sharing inspection data (spectrograms) among multiple Raman spectroscopic devices. The method 600 comprises performing the following steps S610 to S620 through one or more types of communication interfaces which are implemented based on the UDP protocol.

In step S610, the Raman spectroscopic device 110 transmits a request for data of other Raman spectroscopic devices to the server 120.

In step S620, the Raman spectroscopic device 110 receives the requested data of the other Raman spectroscopic devices.

In one embodiment, the server 120 stores inspection data obtained in advance from various Raman spectroscopic devices. Then, the server 120 transmits the stored inspection data to the Raman spectroscopic device 110 which transmits the request for the data.

In another embodiment, after receiving the request for the data, the server 120 initiates data communications with other Raman spectroscopic devices to acquire inspection data thereof, and forwards the acquired inspection data to the Raman spectroscopic device 110.

In another embodiment, after receiving the request for the data, the server 120 forwards the request for the data to various Raman spectroscopic devices, so that each of the other Raman spectroscopic devices transmits respective inspection data directly to the Raman spectroscopic device 110.

In the Raman spectroscopic device according to the disclosed technology and the communication method thereof, a communication structure is established using the UDP protocol. Thus, system integration can be realized in a simpler and quicker manner, "plug and play" of the Raman spectroscopic device can be realized, and the Raman spectroscopic device can be monitored and managed by the management terminal. In addition, due to the use of connectionless communication, there is no need to maintain communication connections, which reduces the burden of the server. When the device has a new inspection result, it can immediately report the inspection result to the server or the management terminal, or upload the inspection result to the server or the management terminal when a network is available and the device is idle, or load historical inspection data which has not been uploaded when the device is powered on and upload the inspection result to the server or the management terminal when a network is available and the device is idle, or upload the inspection result to the server or the management terminal at certain time periods according to requirements of a user of the management terminal.

While the disclosed technology has been described with reference to several typical embodiments, it is apparent to those skilled in the art that the terms are used for illustration and explanation purpose and not for limitation. The disclosed technology may be practiced in various forms without departing from the spirit or essence of the disclosed technology. It should be understood that the embodiments are not limited to any of the foregoing details, and shall be interpreted broadly within the spirit and scope as defined by the following claims. Therefore, all of modifications and alternatives falling within the scope of the claims or equivalents thereof are encompassed by the claims as attached.

The various features and processes described herein may be implemented independently of one another, or may be combined in various ways. All possible combinations and sub combinations are intended to fall within the scope of this disclosure. In addition, certain methods or process blocks may be omitted in some implementations. The methods and processes disclosed herein are also not limited to any particular sequence, and the blocks or states relating thereto can be performed in any other sequences that are appropriate. For example, described blocks or states may be performed in an order other than that specifically disclosed, or multiple blocks or states may be combined in a single block or state. The example blocks or states may be performed in serial, in parallel, or in some other manner as appropriate. Blocks or states may be added to or removed from the disclosed example embodiments as suitable. The example systems and components described herein may be configured differently than described. For example, elements may be added to, removed from, or rearranged compared to the disclosed example embodiments.

What is claimed is:

1. A Raman spectroscopic device, comprising:
   a communication unit configured to communicate with at least one of a server and a management terminal through one or more types of communication interfaces for one or more respective purposes,
   wherein all of the types of communication interfaces are established based on a User Datagram Protocol (UDP),
   wherein, the Raman spectroscopy device is configured to initiate registration of the Raman spectroscopy device in a manner selected from the group consisting of:
      (a) the Raman spectroscopy device broadcasts identification information of the Raman spectroscopy device over a network, and
      (b) the Raman spectroscopy device receives a probe broadcast transmitted by the server and/or the management terminal and then sends its identification information to the server and/or the management terminal.

2. The Raman spectroscopic device according to claim 1, wherein the communication by the communication unit comprises operations of:
   receiving a handshake command from the at least one of the server and the management terminal;
   transmitting a handshake response to the at least one of the server and the management terminal;
   receiving a data package from the at least one of the server and the management terminal; and
   feeding back a result of an operation which is performed according to data in the data package to the at least one of the server and the management terminal.

3. The Raman spectroscopic device according to claim 2, further comprising a processor connected to the communication unit and configured to:
   receive the data package from the communication unit;
   perform an operation according to the data in the data package; and
   return a result of the operation to the communication unit.

4. The Raman spectroscopic device according to claim 2, wherein the communication unit is further configured to:
   verify the data package after receiving the data package; and
   feed back the result of the operation which is performed according to the data in the data package to the at least one of the server and the management terminal only if the verification is successful.

5. The Raman spectroscopic device according to claim 1, wherein the communication by the communication unit further comprises operations of:
   sending Raman spectrum inspection data to the at least one of the server and the management terminal.

6. The Raman spectroscopic device according to claim 1, wherein the communication by the communication unit comprises operations of:
transmitting a request for data of other Raman spectroscopic devices to the at least one of the server and the management terminal; and
receiving the requested data of the other Raman spectroscopic devices.

7. The Raman spectroscopic device according to claim 6, wherein receiving the requested data of the other Raman spectroscopic devices comprises: receiving, from the at least one of the server and the management terminal, data pre-stored in the at least one of the server and the management terminal or acquired by the at least one of the server and the management terminal from various other Raman spectroscopic devices.

8. The Raman spectroscopic device according to claim 6, wherein receiving the requested data of the other Raman spectroscopic devices comprises: receiving the data from various other Raman spectroscopic devices, respectively.

9. A communication method performed by a Raman spectroscopic device, comprising performing the following steps through one or more types of communication interfaces:
initiating registration of the Raman spectroscopy device in a manner selected from the group consisting of:
(a) the Raman spectroscopy device broadcasts identification information of the Raman spectroscopy device over a network, and
(b) the Raman spectroscopy device receives a probe broadcast transmitted by the server and/or the management terminal and then sends its identification information to the server and/or the management terminal;
receiving a handshake command from at least one of a server and a management terminal;
transmitting a handshake response to the at least one of the server and the management terminal;
receiving a data package from the at least one of the server and the management terminal; and
feeding back a result of an operation which is performed according to data in the data package to the at least one of the server and the management terminal,
wherein all of the communication interfaces are established based on a User Datagram Protocol (UDP).

10. The communication method according to claim 9, further comprising:
verifying the data package after receiving the data package; and
feeding back the result of the operation which is performed according to the data in the data package to the at least one of the server and the management terminal only if the verification is successful.

11. A communication method performed by a Raman spectroscopic device, comprising performing the following steps through one or more types of communication interfaces:
initiating registration of the Raman spectroscopy device by one of two following ways: the Raman spectroscopy device broadcasts identification information of the Raman spectroscopy device over a network, or the Raman spectroscopy device receives a probe broadcast transmitted by the server and/or the management terminal and then sends its identification information to the server and/or the management terminal;
wherein all of these communication interfaces are established based on a User Datagram Protocol (UDP).

12. The communication method according to claim 11, further comprising performing the following steps through one or more types of communication interfaces:
transmitting a request for data of other Raman spectroscopic devices to at least one of a server and a management terminal; and
receiving the requested data of the other Raman spectroscopic devices.

13. The communication method according to claim 12, wherein receiving the requested data of the other Raman spectroscopic devices comprises: receiving, from the at least one of the server and the management terminal, data pre-stored in the at least one of the server and the management terminal or acquired by the at least one of the server and the management terminal from various other Raman spectroscopic devices.

14. The communication method according to claim 12, wherein receiving the requested data of the other Raman spectroscopic devices comprises: receiving the data from various other Raman spectroscopic devices, respectively.

* * * * *